3,814,724
POLYMERIZABLE LIQUID COMPOSITIONS FOR
UNSATURATED POLYESTER RESINS
Hiroshi Suzuki, Chiba, and Makoto Iriuchijima, Koichi
Nakamura, and Kazuharu Yagi, Saitama, Japan, assignors to Maruzen Oil Company, Osaka, Japan
No Drawing. Filed Feb. 13, 1973, Ser. No. 331,733
Int. Cl. C08f 21/00, 21/02
U.S. Cl. 260—40 R
25 Claims

ABSTRACT OF THE DISCLOSURE

A polymerizable liquid composition for use in preparing a thermosetting unsaturated polyester resin having a high chemical resistance, especially high alkali resistance, and a cured product obtained therefrom. The liquid composition essentially comprises (a) a polycondensate obtained by reacting (i) 2-methylbutane-1,3-diol, (ii) terephthalic acid, isophthalic acid and/or esters thereof and (iii) an unsaturated dicarboxylic acid, and (b) an ethylenically unsaturated monomer.

BACKGROUND OF THE INVENTION

1. Field of the invention

This invention relates to a polymerizable liquid composition for use in preparing a cured thermosetting unsaturated polyester resin having excellent chemical resistance, especially resistance to alkali. More specifically, this invention relates to a liquid composition of an unsaturated polyester resin which has good fluidity at room temperature even in the absence of a solvent or diluent and can give a substantially insoluble and infusible cured product by curing under polymerization conditions.

2. Description of the prior art

Liquid compositions of an unsaturated polyester resin obtained by dissolving a polycondensate of a saturated dicarboxylic acid such as phthalic anhydride, succinic acid, adipic acid, azelaic acid or sebacic acid, an unsaturated dicarboxylic acid such as maleic anhydride, fumaric acid, itaconic acid or citraconic acid, and a diol such as ethylene glycol, diethylene glycol, propylene glycol, dipropylene glycol, 1,3-butanediol, 1,4-butanediol or neopentyl glycol in an ethylenically unsaturated monomer such as styrene, methyl styrene or methyl methacrylate are generally known. These compositions are liquid at room temperature, and the cured products obtained by curing the liquid compositions under polymerization conditions have good mechanical and electrical properties. Nevertheless, the cured products of these known unsaturated polyester resins have scarcely been used in fields where chemical resistance is required, such as in chemical plants, chemical tanks or pipes, because they have poor chemical resistance, especially poor resistance to alkali.

Accordingly, research and development studies have been extensively done in this art on liquid compositions for use in preparing cured products of unsaturated polyester resins having superior chemical resistance, especially resistance to alkali. No satisfactory reports have yet been made with respect to the costs and properties of such liquid compositions and the cured products thereof.

For example, Japanese Patent Publication No. 14950/61 discloses a liquid composition of an unsaturated polyester resin of the isophthalic acid type prepared by dissolving a polycondensate of isophthalic acid, a conventional unsaturated dicarboxylic acid and a polyhydric alcohol, especially propylene glycol, in an unsaturated monomer such as styrene. However, the cured product of this liquid composition has poor resistance to alkali (see Comparative Examples 3 to 5 to be given). The polycondensate of isophthalic acid, unsaturated dicarboxylic acid and propylene glycol is hardly soluble in unsaturated monomers except for styrene, such as methyl styrene or methyl methacrylate.

An unsaturated polyester resin of the terephthalic acid type obtained by dissolving a polycondensate of dimethyl terephthalate, maleic anhydride and propylene glycol in styrene has also been reported. However, this polycondensate of the terephthalic acid type has a relatively high molecular weight, is hardly soluble in styrene and the polycondensation reaction takes a long time. Moreover, the resulting liquid composition has a very high viscosity and is a milky gel or tacky material (see Comparative Examples 6 to 9 to be given) and tends to crystallize. Such a composition of the terephthalic acid type can scarcely be used in laminating, molding or casting.

For this reason, liquid unsaturated polyester resin compositions of the terephthalic acid type having a relatively low viscosity obtained by dissolving a condensate of very low molecular weight (for example, less than about 1,000) in styrene have been proposed. However, the cured products obtained from such compositions have poor mechanical properties and poor chemical resistance.

Thus, it has been considered in the art that even if terephthalic acid, isophthalic acid or an ester thereof is used as the saturated dicarboxylic acid component of a conventional unsaturated polyester resin, a liquid composition for unsaturated polyester resins having superior chemical resistance, especially resistance to alkali and low viscosity, could not be obtained.

On the other hand, British Pat. 846,912 discloses a liquid composition of an unsaturated polyester resin obtained by dissolving a polycondensate of phthalic anhydride, adipic acid or succinic acid, maleic anhydride, fumaric acid or itaconic acid and 2-methylbutane-1,3-diol in styrene. However, the cured product obtained from this liquid composition also has extremely poor resistance to alkali (see Comparative Example 2 to be given).

Unsaturated polyester resins obtained using conventional diols such as propylene glycol also have poor alkali resistance in their cured form. To overcome this difficulty, there have been recently reported unsaturated polyester resins of the bisphenol type having alkali resistance in which the diol component is bisphenol, or hydrogenated bisphenol of 2,2 - bis[para-(hydroxy-n-propoxy)-phenyl] propane. However, the resulting unsaturated polyester resins are very costly since the bisphenols are expensive.

In order to obtain cured products of unsaturated polyester resins having superior chemical resistance, especially resistance to alkali, it has been necessary, contrary to economic demands, to use special and expensive diols having a 6-membered ring in their molecules, such as the bisphenols.

Thus, it has been considered in the art that even if the conventional lower aliphatic diols (containing 2-methylbutane-1,3-diol) are used as the diol component of the unsaturated polyester resin, a liquid composition for an unsaturated polyester resin having superior chemical resistance, especially resistance to alkali, could not be obtained.

SUMMARY OF THE INVENTION

Accordingly, a basic object of this invention is to provide a novel liquid composition for use in preparing a cured product of an unsaturated polyester resin which is low in cost and has superior chemical resistance, especially alkali resistance.

Another object of this invention is to provide a liquid composition of an unsaturated polyester resin having good alkali resistance prepared from terephthalic acid or isophthalic acid and lower aliphatic diols which have been considered in the art to be unsuitable as materials for producing unsaturated polyesters having superior alkali resistance.

Still another object of this invention is to provide a liquid composition of an unsaturated polyester resin of the terephthalic or isophthalic acid type having good fluidity at room temperature.

A further object of this invention is to provide a liquid composition for use in preparing a cured product of an unsaturated polyester resin having superior water resistance, namely low water absorption.

A still further object of this invention is to provide a liquid composition for an alkali-stable unsaturated polyester resin curable in the presence of air or oxygen.

These and other objects of this invention will become apparent from the following description.

DETAILED DESCRIPTION OF THE INVENTION

We have now found that a liquid composition of an unsaturated polyester resin containing (a) a polycondensate obtained from a new combination of terephthalic acid and/or isophthalic acid, a specific aliphatic diol (2-methylbutane-1,3-diol) and a conventional unsaturated dicarboxylic acid and (b) a conventional ethylenically unsaturated monomer has the following surprising, unexpected excellent properties: it is a liquid of low viscosity and has good fluidity at room temperature, and accordingly this liquid composition can easily be impregnated in or adhered to glass fibers etc., and is useful as a material for producing fiber reinforced plastics; it can also be easily mixed with a large amount of a filler or a reinforcing material. And, since the liquid composition is transparent and has good adhesive ability, it is also useful as a material for an organic glass or adhesive.

The cured product obtained by curing the liquid composition according to the present invention also has a surprisingly superior chemical resistance, especially alkali resistance, as compared with conventional unsaturated polyester resins.

In the alkali resistance test of cured products (casting sheets) immersed in a boiling 10% aqueous solution of sodium hydroxide (Japanese Industrial Standard (JIS) K-6919) many of the cured products in accordance with the present invention showed an excellent durability (life) of 150 hours. On the other hand, conventional cured products have a durability of less than about 25 hours, and most of them have a durability of less than about 10 hours.

The coefficient of shrinkage of the liquid composition of this invention is about 6% when it is cured under polymerization conditions to form cured products, whereas conventional liquid compositions have a coefficient of shrinkage of about 8 to 11% under the same conditions. Accordingly, the liquid composition of the unsaturated polyester resin in accordance with this invention has good dimensional stability during curing and can give a flat, hard surface in the production of fiber reinforced plastics.

Furthermore, the liquid composition gives off a relatively small amount of exothermic heat at curing, and therefore, cracks and bubbles hardly form in the cured product.

The liquid unsaturated polyester composition of this invention having such superior characteristics is usually produced by the following process.

This process comprises first reacting (i) 2-methylbutane-1,3-diol, (ii) terephthalic acid, isophthalic acid and/or an ester thereof (referred to hereinafter as "an aromatic dicarboxylic acid"), and (iii) an unsaturated dicarboxlic acid under polycondensation conditions to form a polycondensate.

The starting material 2-methylbutane-1,3-diol is usually produced by hydrogenating an aldol condensation product of methyl ethyl ketone and formaldehyde, but the production thereof is not limited to this route.

An ester of 2-methylbutane-1,3-diol and a lower aliphatic monocarboxylic acid, preferably an aliphatic monocarboxylic acid having one to three atoms, can also be used instead of 2-methylbutane-1,3-diol component (i).

The ester of terephthalic acid or isophthalic acid is usually an ester obtained by esterification of the aromatic dicarboxylic acid with a lower monohydric alkanol, i.e., a di-lower alkyl ester, preferably a dialkyl having a $C_{1-4}$ alkyl group ester, more preferably a dimethyl ester.

The unsaturated dicarboxylic acid used in this invention is well known in the art as the unsaturated dicarboxylic acid component of conventional unsaturated polyesters, and includes compounds containing two carboxyl groups (—COOH) or one acid anhydride group

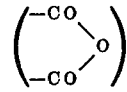

and one ethylenic unsaturation (>C=C<) in the molecule. Preferred acids are the unsaturated dicarboxylic acids having four to six carbon atoms. For example, maleic anhydride, maleic acid, fumaric acid, itaconic acid, citraconic acid, mesaconic acid, chloromaleic acid and mixtures thereof can be used. Of these, maleic anhydride and fumaric acid are preferred by reason of their ready availability, relatively low cost and the excellent results obtainable.

The polycondensation reaction is usually carried out in two or more stages. For instance, 2-methylbutane-1,3-diol is first reacted with the aromatic dicarboxylic acid, and then the reaction mixture is further reacted with the unsaturated dicarboxylic acid. The use of a multi-stage process has the advantage that the reaction conditions and the properties of the polycondensate can be easily controlled. The polycondensate used in this invention, however, is not limited to products obtained by these methods.

The reaction proceeds easily in the presence or absence of a catalyst. Catalysts suitable for the polycondensation reaction include known esterification or transesterification catalysts, e.g., metals such as zinc, metal oxides such as zinc oxide, lead oxide, antimony oxide or titanium oxide, organic or inorganic metal salts such as zinc acetate, calcium acetate, cobalt acetate, manganese acetate, lead acetate, stannous oxalate, zinc naphthenate, zirconium naphthenate, aluminum sulfate or lead nitrate, organic metal compounds such as tetrabutyl zirconate, tetrabutyl titanate, tributyl antimony, metal halides such as zinc chloride, titanium tetrafluoride, or aluminum chloride, acids such as sulfuric acid, phosphoric acid or p-toluene sulfonic acid, and ion exchange resins. These catalysts can be used either alone or as combinations thereof. The catalyst is usually used in an amount of 0.01–1% by weight, preferably 0.05–0.5% by weight, based on the aromatic dicarboxylic acid.

Usually, the polycondensation is carried out at a temperature of 100 to 230° C. at about 0.5 to about 10 atms., preferably at atmospheric pressure, for 2 to 20 hours in an inert atmosphere, preferably by bubbling an inert gas such as carbon dioxide or nitrogen through the esterification mixture. During the course of the reaction, water (alcohol in the case of using the ester of the aromatic dicarboxylic acid) is formed and reduces the rate of reaction. It is desirable, therefore, to eliminate the water (or alcohol) from the reaction system as soon as possible, e.g., by bubbling an inert gas through the esterification mixture, etc.

The termination of the polycondensation reaction is based on the acid value of the polycondensate. Usually, the reaction is terminated when the acid value of the polycondensate reaches no more than 50 (mg. KOH/g.), preferably no more than 30.

The molecular weight distribution of the resulting polycondensate can be varied over a wide range according to such factors as the combination of the starting materials, the reaction conditions, etc., but is generally within the range of about 1,000 to about 10,000, preferably about 1,500 to about 6,000.

The composition of the polycondensate varies widely depending upon the combination of the starting materials, the amounts of the materials, the polycondensation reaction conditions, etc., and also the ultimate use of the cured product. Usually, however, the mole ratio of the aromatic dicarboxylic acid component to the unsaturated dicarboxylic acid component in the resulting polycondensate is about 8:1 to about 1:8, preferably about 4:1 to about 1:4. Polycondensates outside this range are, however, also included within the scope of the present invention. The mole ratio of the 2-methylbutane-1,3-diol component to the sum of the aromatic dicarboxylic acid and the unsaturated dicarboxylic acid component in the polycondensate (referred to hereinafter as the mole ratio of diol to acid) is about 0.9 to about 1.2, preferably about 1.0 to about 1.1. If the mole ratio of diol to acid is outside the above range, the mechanical and electrical properties and chemical resistance of the resulting cured product tend to be inferior.

In the preparation of the polycondensate described above, a part of the 2-methylbutane-1,3-diol and/or a part of terephthalic acid, isophthalic acid or esters thereof may be respectively replaced by a known diol and/or a known saturated dicarboxylic acid which have been used for preparing conventional unsaturated polyester resins. These different diols and/or unsaturated dicarboxylic acids are used in amounts which do not bring about a marked reduction in the chemical resistance, especially alkali resistance, of the unsaturated polyester resins of the present invention. Usually, the amount of 2 - methylbutane - 1,3 - diol is about 30–100 [mol/mol] percent, preferably about 40–100 [mol/mol] percent, of the total diol component, and the remainder is the different diol. The different diol comprises a lower aliphatic diol (excluding 2-methylbutane-1,3-diol), preferably an aliphatic diol having two to six carbon atoms, bisphenol, hydrogenated bisphenol and 2,2-bis[para(hydroxy-n-propoxy)-phenyl]propane as above-mentioned. The content of the different saturated dicarboxylic acid in the total saturated dicarboxylic acid component is also 0 to about 60 [mol/mol] percent, preferably 0 to about 50 [mol/mol] percent. The different saturated dicarboxylic acid can be phthalic anhydride, succinic acid, adipic acid, azelaic acid, sebacic acid and the like, or a mixture thereof.

The ratio of the starting materials (2-methylbutane-1,3-diol, aromatic dicarboxylic acid, and unsaturated dicarboxylic acid) used in the polycondensation reaction is determined on the basis of the composition of the polycondensate mentioned above, because the molar proportion of materials in the reaction system is almost exactly correlated with the final molar proportions in the polycondensate. The mole ratio of the total diols to the total acids is industrially at least 1, that is, the diols are used in an excessive amount to the chemical equivalent of the total acids. This is based on the easy control of the molecular weight distribution of the polycondensate, easy removal of excess diols from the polycondensate at reduced pressure, the evaporation loss of a small amount of the diols from the reaction system, etc.

The polycondensate produced is cooled to a temperature no more than about 150° C., preferably about 140° C., and then mixed with the ethylenically unsaturated monomer to provide the liquid composition for the unsaturated polyester resin of this invention in the form of a homogeneous solution having good fluidity at room temperature. It is preferred that the mixing of the polycondensate with the unsaturated monomer is performed in the presence of a small amount of a polymerization inhibitor. The amount of the inhibitor is varied widely according to the mixing temperature of the polycondensate and the unsaturated monomer, but is usually about 50 to about 500 p.p.m. based on the weight of the liquid composition. The polymerization inhibitors are known in the art such as hydroquinones, e.g. hydroquinone, p-tert.-butylcatechol and mono-tert.-butylhydroquinone, and quinones, e.g., p-benzoquinone, naphthoquinone and 2,5-diphenyl-p-benzoquinone. Others known to the art, e.g., those described in U.S. Pats. 2,453,665 and 2,593,787 can also be used.

The ethylenically unsaturated monomers comprise any compounds capable of cross linking with the polycondensate under the polymerization (curing) conditions to give a solid (substantially insoluble and infusible) cured product, as is well known in the art. Usually, they contain the reactive group $CH_2=C<$ and have a boiling point of at least 60° C. Some suitable unsaturated monomers are styrene, sidechain alkyl and halo substituted styrenes such as alpha methylstyrene, alpha chlorostyrene, alpha ethylstyrene and the like, alkyl and halo ring-substituted styrenes such as ortho, meta and paraalkyl styrenes such as o-methylstyrene, m-propylstyrene, p-tert.butylstyrene, 2,4-dimethylstyrene, chlorostyrene, bromostyrene, dichlorostyrene and the like or polyvinylbenzenes such as divinylbenzene. Still further, one can make use of the vinyl compounds such as vinyl acetate, methyl methacrylate, methyl acrylate and the like and the allyl compounds such as diallyl phthalate, tetrachlorodiallyl phthalate, allyl alcohol, allyl acetate, allyl methacrylate, triallyl cyanurate and the like. They may be used either alone or in admixture. Of course, styrene is used for commercial operation by reason of its low cost.

The content of the unsaturated monomer in the liquid composition is usually about 10 to about 60% by weight, preferably about 20 to about 50% by weight. If the content of unsaturated monomer is less than 10% by weight, the mechanical properties and the chemical resistance of the cured product are poor, and if it exceeds 60% by weight, the mechanical properties of the cured product deteriorate.

Such a liquid composition has good fluidity at room temperature, and can be stored at room temperature in the liquid state for long periods.

A solid cured product having any desired shape can be obtained by application of this liquid unsaturated polyester composition to suitable polymerization (curing) conditions in the presence or absence of oxygen or air so as to cause the crosslinking (polymerization) of the polycondensate and the unsaturated monomer in the composition. The liquid composition can be impregnated in glass fibers, asbestos, etc., or mixed with known inert additives such as fillers, reinforcing agents, pigments, dyes, mold lubricants or flow promoters, to provide a cured product containing such additives by any of the known methods such as coating, roller mixing, etc. The liquid compositions containing glass fibers are especially useful for the production of fiber-reinforced plastics. The content of glass fibers in such a composition is usually about 5 to about 90% by weight, preferably about 20 to about 80% by weight. Any well-known polymerization method used for producing conventional unsaturated polyester resins can be applied to the polymerization of this invention. For example, the use of a polymerization catalyst, heating or heating and pressure (e.g. see U.S. Pat. 2,851,437) and irradiation with ultraviolet or radioactive rays (e.g. see Modern Plastics 43 (10) 111 (1966)) are useful in this invention. The polymerization catalysts used are well-known compounds such as the organic peroxides and the alcoholic and acidic peroxides. Among the preferred catalysts are: the acidic peroxides, e.g. benzoyl peroxide, cumene hydroperoxide, phthalic peroxide, succinic peroxide, benzoyl acetic peroxide, peracetic acid and perbenzoic acid; ketone peroxides, e.g., methyl ethyl ketone peroxide; alcohol peroxides, e.g., tert.-butyl hydroperoxide and fatty oil acid peroxides, e.g., coconut oil acid peroxides, lauric peroxide, steric peroxide.

Polymerization promoters can also be used in combination with the polymerization catalyst to obtain a suitable rate of polymerization, e.g., organic acid salts of cobalt such as cobalt naphthenate or tertiary amines as disclosed in U.S. Pats. 2,466,800 and 2,480,928.

The amount of the polymerization catalyst or promoter varies widely according to the characteristics of the liquid composition, the amount of the polymerization inhibitor contained therein, the polymerization conditions, etc., but each is usually used in amount of about 0.005 to about 5% by weight, preferably about 0.05 to about 3% by weight, based on the weight of the liquid composition.

Usually, the curing of the composition is performed at a temperature up to about 150° C. with or without the application of pressure. Higher temperatures can also be used, but the temperature should not be high enough to volatilize any of the ingredients in the initial stages of curing or to discolor the final product.

The time of curing will vary greatly depending upon such factors as the size and thickness of the body to be formed and the temperature of curing. Usually, about 2 minutes to about 20 hours is sufficient.

The novel thermosetting liquid compositions for unsaturated polyester resins according to this invention are suited for laminating, molding and for use in the preparation of adhesives, surface coatings and castings. The cured products of this invention exhibit outstanding chemical resistance, especially alkali resistance.

The following description will illustrate in greater detail the manufacturing conditions of the liquid unsaturated polyester resin compositions of this invention and the excellent properties of the cured products obtained from the liquid compositions.

EXAMPLE 1

(A) Liquid composition of an unsaturated polyester resin 4.4 mols (457.6 g.) of 2-methylbutane-1,3-diol and 2 mols (332 g.) of terephthalic acid were charged into a one liter reactor equipped with a condenser, a stirrer and a thermometer. With stirring, a first-stage polycondensation reaction was performed in an atmosphere of nitrogen under atmospheric pressure at a temperature of 210 to 230° C. for 15 hours. 71 ml. of water (including 2-methylbutane-1,3-diol) was evaporated off during the first stage reaction. The resulting product had an acid value of 3 (mg. KOH/g.). The mixture was cooled to 160° C., and then 2 mols (196 g.) of maleic anhydride was added thereto. With continued stirring, a second-stage polycondensation reaction was performed in an atmosphere of nitrogen under atmospheric pressure at a temperature of 160 to 220° C. for 10 hours. 30 ml. of water (including 2-methylbutane-1,3-diol) was evaporated off during the second-stage reaction. The resulting product had an acid value of 18.2 (mg. KOH/g.). The product was further heated for one hour at 180° C. under 10 mm. Hg (abs.) to provide 861 g. of a polycondensate.

The resulting polycondensate was cooled to below 100° C., and mixed well with 4.8 mols (500 g.) of styrene monomer and 200 p.p.m. (based on the weight of the liquid composition) of hydroquinone to form a homogenous solution of unsaturated polyester resin which was liquid at room temperature. This liquid product was transparent and had a viscosity of 8.5 poises at 25° C.

(B) Casting sheet (cured product)

One part of the resulting liquid composition was well mixed with 0.9% by weight, based on the weight of the liquid composition, of benzoyl peroxide, and the mixture was spread on a glass sheet in a thickness of 3 mm. This layer-like mixture was cured for 2 hours at 75° C. and for another 2 hours at 100° C. (both at atmospheric pressure).

The cured casting sheet was cut into test specimens having a size of 75 mm. x 30 mm. (thickness 3 mm.). Three test specimens were immersed in a boiling 10 wt. percent aqueous solution of sodium hydroxide in accordance with the alkali resistance test of JIS K–6919 (1970). Only after 150 hours (average of the three specimens) were cracks, deformation, breakdown and swelling of the specimens observed.

Three other test specimens were also immersed for 10 hours in a boiling 10% aqueous solution of sodium hydroxide to test water absorption. The percentage of the water absorbed was calculated on the basis of the change in weight of the specimen before and after immersion. The percentage of the water absorbed of the test specimen (average of the three sheets) was 0.50%.

(C) Laminated sheet (cured product)

Another part of the liquid composition was mixed well with 0.9% by weight (based on the weight of the liquid composition) of benzoyl peroxide, and the mixture was impregnated into a laminate of 12 superposed glass fiber cloths (size 30 x 30 cm.) in accordance with JIS K–6919 (1970). The composition so impregnated was cured at a pressure of 30 kg./cm.$^2$ G for one hour at 75° C., and further for 2 hours at 100° C. without the application of pressure.

The cured laminated sheet (thickness 3 mm., glass content 60–66% by weight) was cut to a predetermined size in order to use it in various tests. The laminated moldings had a flexural strength of 42.6 kg./mm.$^2$ (based on the standard state, i.e., at a temperature of 20±5° C. and a relative humidity of 65±20%), a tensile strength of 32.9 kg./mm.$^2$ (standard state), a Barcol hardness of 66 and a flexural modulus of 2,670 kg./mm.$^2$ (standard state).

EXAMPLES 2 to 23

The conditions for manufacturing the liquid unsaturated polyester resin compositions in Examples 2 to 23 and the viscosities of the compositions are shown in Table 1. The properties of the cured products obtained therefrom are shown in Table 2. Items not specifically described are the same as in Example 1. The main data presented in Example 1 are also shown in Tables 1 and 2 for Examples 2 to 23.

The abbreviations used in Tables 1 and 3 (see the Comparative Examples) stand for the following compounds.

TA=terephthalic acid
DMT=dimethyl terephthalate
IPA=isophthalic acid
DMI=dimethyl isophthalate
IPG=2-methylbutane-1,3-diol
PG=propylene glycol
EG=ethylene glycol
BG=1,3-butanediol
NPG=neopentyl glycol
DEG=diethylene glycol
MA=maleic anhydride
FA=fumaric acid
PA=phthalic anhydride
ST=styrene
MS=alpha methylstyrene
BS=p-tert.butyl styrene
MMA=methyl methacrylate

TABLE 1

First-stage polycondensation reaction

| Example | Saturated dicarboxylic acid Type | Moles | Polyhydric alcohol Type | Moles | Temperature (°C.) | Time (hrs.) | Acid value of the product (mg. KOH/g.) |
|---|---|---|---|---|---|---|---|
| 1 | TA | 2.0 | IPG | 4.4 | 210–230 | 15.0 | 3.0 |
| 2 | TA | 1.0 | IPG | 2.2 | 210–230 | 13.5 | 3.0 |
| 3 | TA | 2.0 | IPG | 4.4 | 210–230 | 15.0 | 3.0 |
| 4 | TA | 2.0 | IPG | 4.4 | 210–230 | 15.0 | 3.0 |
| 5 | TA | 2.0 | IPG | 4.4 | 210–230 | 15.0 | 3.0 |
| 6 | TA | 2.0 | IPG | 4.4 | 210–320 | 15.0 | 3.0 |
| 7 | TA | 2.0 | IPG | 4.4 | 210–230 | 15.0 | 3.0 |
| 8 | DMT | 1.0 | IPG | 2.2 | 150–190 | *11.5 | ---- |
| 9 | IPA | 1.0 | IPG | 2.2 | 180–210 | 11.5 | 24.0 |
| 10 | IPA | 1.0 | IPG | 2.2 | 180–210 | 11.5 | 33.0 |
| 11 | DMI | 2.0 | IPG | 4.4 | 150–190 | *11.5 | ---- |
| 12 | {TA / IPA} | {1.0 / 1.0} | IPG | 4.4 | 180–230 | 13.0 | 8.0 |
| 13 | TA | 1.0 | IPG | 4.4 | 180–230 | 10.0 | 3.0 |
| 14 | TA | 1.0 | IPG | 4.4 | 180–230 | 10.0 | 3.0 |
| 15 | TA | 0.8 | {IPG / PG} | {1.32 / 0.44} | 180–220 | 18.0 | 8.5 |
| 16 | TA | 0.8 | {IPG / PG} | {0.88 / 0.88} | 180–220 / 180–220 | 14.0 / 10.0 | 4.0 / 6.5 |
| 17 | IPA | 0.8 | {IPG / PG} | {1.32 / 0.44} | 180–220 | | |
| 18 | TA | 0.8 | {IPG / EG} | {0.88 / 0.88} | 180–210 | 22.0 | 7.7 |
| 19 | TA | 2.0 | {IPG / BG} | {2.2 / 2.2} | 160–220 | 15.4 | 6.0 |
| 20 | TA | 0.8 | {IPG / NPG} | {0.88 / 0.88} | 200–230 | 20.0 | 6.5 |
| 21 | TA | 0.8 | {IPG / PG} | {0.88 / 0.88} | 180–220 | 14.0 | 4.5 |
| 22 | TA | 2.0 | {IPG / PG / NPG} | {2.2 / 1.1 / 1.1} | 160–230 | 18.0 | 3.0 |
| 23 | DMT | 0.8 | {IPG / PG} | {0.88 / 0.88} | 120–150 | *3.0 | ---- |

Second stage polycondensation

| Example | Unsaturated dicarboxylic acid (saturated dicarboxylic acid) Type | Moles | Temperature (°C.) | Time (hrs.) | Acid value of the product (mg. KOH/g.) | Ethylenically unsaturated monomer Type | Moles | Viscosity of the composition (poise) |
|---|---|---|---|---|---|---|---|---|
| 1 | MA | 2.0 | 160–220 | 10.0 | 18.2 | ST | 4.8 | 8.5 |
| 2 | FA | 1.0 | 160–200 | 12.0 | 17.5 | ST | 2.4 | 10.0 |
| 3 | MA | 2.0 | 160–220 | 10.0 | 19.2 | MS | 4.8 | 4.2 |
| 4 | MA | 2.0 | 160–220 | 10.0 | 19.2 | BS | 4.8 | 1.6 |
| 5 | MA | 2.0 | 160–220 | 10.0 | 19.2 | {ST / MMA} | {2.4 / 2.4} | 6.1 |
| 6 | MA | 2.0 | 160–220 | 10.0 | 19.2 | ST | 8.2 | 1.1 |
| 7 | MA | 2.0 | 160–220 | 10.0 | 19.2 | ST | 2.8 | 83 |
| 8 | FA | 1.0 | 190–210 | 7.0 | 16.0 | ST | 2.4 | 10.7 |
| 9 | MA | 1.0 | 120–220 | 8.5 | 18 | ST | 2.4 | 7.6 |
| 10 | FA | 1.0 | 120–220 | 6.0 | 27.5 | ST | 2.4 | 3 |
| 11 | MA | 2.0 | 160–210 | 10.5 | 18 | ST | 4.8 | 7.5 |
| 12 | MA | 1.0 | 120–220 | 7.5 | 21 | ST | 4.8 | 5.8 |
| 13 | {MA / (PA)} | {2.0 / 1.0} | 160–220 | 7.0 | 6.2 | ST | 4.8 | 5.0 |
| 14 | {FA / (PA)} | {2.0 / 1.0} | 160–220 | 7.0 | 6.4 | ST | 4.8 | 5.2 |
| 15 | MA | 0.8 | 120–220 | 9.0 | 15.5 | ST | 2.2 | 7.5 |
| 16 | MA | 0.8 | 120–220 | 10.0 | 16.8 | ST | 2.1 | 8.1 |
| 17 | MA | 0.8 | 120–220 | 9.0 | 15.7 | ST | 2.2 | 4.2 |
| 18 | MA | 0.8 | 120–220 | 8.0 | 15.4 | ST | 2.0 | 9.8 |
| 19 | MA | 2.0 | 140–210 | 8.0 | 22.8 | ST | 4.7 | 4.2 |
| 20 | MA | 0.8 | 120–220 | 2.0 | 16.4 | ST | 2.3 | 15.2 |
| 21 | FA | 0.8 | 160–220 | 10.0 | 17.2 | ST | 2.0 | 8.8 |
| 22 | MA | 2.0 | 120–220 | 11.0 | 22.0 | ST | 4.7 | 12.2 |
| 23 | MA | 0.8 | 120–220 | 9.0 | 10.4 | ST | 2.0 | 8.0 |

(cf.) *In Examples 8 and 11, 0.2% by weight, based on the starting dimethyl ester, of zinc acetate catalyst was used. In Example 23, 0.2% by weight, based on the starting dimethyl ester, of lead oxide catalyst was used.

TABLE 2

| Example | Casting sheet | | Laminated sheet | |
|---|---|---|---|---|
| | Alkali resistance, time of durability (hrs.) | Water absorption (percent) | Flexural strength (kg./mm.²) | Tensile strength (kg./mm.²) |
| 1 | 150 | 0.50 | 42.6 | 32.9 |
| 2 | 150 | 0.40 | 45.5 | 32.8 |
| 3 | 120 | 0.35 | 40.8 | 32.0 |
| 4 | 120 | 0.22 | 40.1 | 31.8 |
| 5 | 120 | 0.50 | 43.5 | 33.2 |
| 6 | 150 | 0.45 | 47.0 | 35.2 |
| 7 | 90 | 0.60 | 37.8 | 30.4 |
| 8 | 150 | 0.40 | 47.2 | 34.0 |
| 9 | 120 | 0.27 | 36.9 | 30.5 |
| 10 | 120 | 0.48 | 40.4 | 32.7 |
| 11 | 120 | 0.50 | 40.5 | 31.6 |
| 12 | 130 | 0.47 | 41.3 | 32.9 |
| 13 | 120 | 0.79 | 39.2 | 34.0 |
| 14 | 120 | 0.76 | 40.2 | 33.3 |
| 15 | 70 | 0.18 | 43.4 | 33.8 |
| 16 | 50 | 0.48 | 40.4 | 34.6 |
| 17 | 45 | 0.52 | 39.2 | 34.6 |
| 18 | 50 | 0.65 | 42.4 | 33.9 |
| 19 | 80 | 0.64 | 42.5 | 32.8 |
| 20 | 120 | 0.09 | 49.6 | 34.8 |
| 21 | 60 | 1.85 | 44.6 | 34.2 |
| 22 | 100 | 0.80 | 44.3 | 35.1 |
| 23 | 50 | 2.01 | 41.0 | 34.4 |

COMPARATIVE EXAMPLES 1 TO 9

The conditions for manufacturing the liquid unsaturated polyester compositions and their viscosities in Comparative Examples 1 to 9 are shown in Table 3 below. The properties of the cured products obtained therefrom are shown in Table 4. Items not specifically described are the same as the Example 1.

TABLE 3

First-stage polycondensation

| Comparative example | Saturated dicarboxylic acid | | Polyhydric alcohol | | Temperature (° C.) | Time (hrs.) | Acid value of the product (mg.KOH/g.) |
|---|---|---|---|---|---|---|---|
| | Type | Moles | Type | Moles | | | |
| 1 | PA | 0.8 | PG | 1.76 | 160–200 | 8.0 | 10.4 |
| 2 | PA | 0.8 | IPG | 1.76 | 160–200 | 8.0 | 9.5 |
| 3 | IPA | 1.0 | PG | 2.2 | 180–205 | 9.0 | 15.0 |
| 4 | IPA | 1.0 | DEG | 2.1 | 180–200 | 10.0 | 17.0 |
| 5 | IPA | 1.0 | BG | 2.1 | 185–200 | 10.5 | 18.0 |
| 6 | TA | 0.8 | EG | *4.0 | 190–200 | 11.0 | 10.0 |
| 7 | TA | 0.8 | PG | 1.76 | 190–200 | 50.0 | 9.4 |
| 8 | TA | 0.8 | BG | 1.76 | 190–200 | 35.0 | 9.6 |
| 9 | TA | 0.8 | NPG | 1.76 | 210–230 | 28.0 | 3.4 |

Second-stage polycondensation

| Comparative example | Unsaturated dicarboxylic acid | | Temperature (° C.) | Time (hrs.) | Acid value of the (mg. KOH/g.) | Ethylenically unsaturated monomer | | Viscosity of the composition (poise) |
|---|---|---|---|---|---|---|---|---|
| | Type | Moles | | | | Type | Moles | |
| 1 | MA | 0.8 | 120–220 | 7.0 | 14.6 | ST | 1.9 | 6.1 |
| 2 | MA | 0.8 | 120–220 | 8.0 | 12.9 | ST | 2.3 | 1.2 |
| 3 | MA | 1.0 | 130–220 | 10.5 | 26.0 | ST | 2.2 | 7.0 |
| 4 | MA | 1.0 | 180–220 | 5.0 | 25.0 | ST | 2.4 | 2.5 |
| 5 | MA | 1.0 | 100–220 | 7.5 | 25.0 | ST | 2.3 | 7.0 |
| 6 | MA | 0.8 | 120–220 | 10.0 | 13.5 | ST | 1.8 | (*) |
| 7 | MA | 0.8 | 120–220 | 10.0 | 12.7 | ST | 2.2 | (**) |
| 8 | MA | 0.8 | 120–220 | 10.0 | 13.2 | ST | 2.3 | 13.0 |
| 9 | MA | 0.8 | 120–220 | 10.0 | 14.7 | ST | 2.3 | (**) |

*4.0 moles of EG was used for obtaining high reaction rate. After the first-stage polycondensation, 2.24 moles of EG was distilled out at reduced pressure.
**Very high viscosity (above about 400 poises).

TABLE 4

| Comparative example | Casting sheet | | Laminated sheet | |
|---|---|---|---|---|
| | Alkali resistance, time of durability (hrs.) | Water absorption (percent) | Flexural strength (kg./mm.²) | Tensile strength (kg./mm.²) |
| 1 | 4 | 16.22 | 39.1 | 36.4 |
| 2 | 6 | 5.46 | 33.1 | 36.4 |
| 3 | 10 | 7.04 | 35.6 | 33.3 |
| 4 | <1 | 5.21 | 53.2 | 36.5 |
| 5 | 25 | 3.69 | 46.7 | 34.0 |
| 6 | (Test sheet could not be prepared because of very high viscosity and milky turbidity.) | | | |
| 7 | (Test sheet could not be prepared because of very high viscosity and milky turbidity.) | | | |
| 8 | 25 | 3.50 | 45.2 | 33.5 |
| 9 | (Test sheet could not be prepared because of very high viscosity and milky turbidity.) | | | |

The following become apparent from the results shown in Tables 1 to 4.

(a) The unsaturated polyester resins according to this invention have surprisingly superior chemical resistance, especially alkali resistance, as compared with conventional unsaturated polyester resins.

(b) The unsaturated polyester resins of this invention have a far lower water absorption than conventional unsaturated polyester resins.

(c) The unsaturated polyester resins of this invention have the same mechanical properties as conventional unsaturated polyester resins.

While the invention has been described in detail and with reference to specific embodiments thereof, it will be apparent to one skilled in the art that various changes and modifications can be made therein without departing from the spirit and scope thereof.

What we claim is:

1. A composition of matter which comprises a polymerizable liquid composition for forming an unsaturated polyester resin consisting essentially of (a) a polycondensate of (i) 2-methylbutane-1,3-diol, (ii) an aromatic dicarboxylic acid selected from the group consisting of terephthalic acid, isophthalic acid and esters thereof, and (iii) an unsaturated dicarboxylic acid, and (b) an ethylenically unsaturated monomer.

2. The composition of matter of claim 1 wherein the content of said polycondensate is about 40 to about 90% by weight based on the total weight of (a) and (b), and the content of said ethylenically unsaturated monomer is about 10 to about 60% by weight based on the total weight of (a) and (b).

3. The composition of matter of claim 2 wherein the content of said polycondensate is about 50 to about 80% by weight based on the total weight of (a) and (b), and the content of said ethylenically unsaturated monomer is about 20 to about 50% by weight based on the total weight of (a) and (b).

4. The composition of matter of claim 1 wherein the mol ratio of the aromatic dicarboxylic acid component to the unsaturated dicarboxylic acid component in said polycondensate is from about 8:1 to about 1:8.

5. The composition of matter of claim 1 wherein the molar ratio of the 2-methylbutane-1,3-diol component (i) to the sum of the dicarboxylic acids component (ii) and (iii) in said polycondensate is from about 0.9:1 to about 1.2:1.

6. The composition of matter of claim 1 wherein said polycondensate has a molecular weight distribution within the range of about 1,000 to about 10,000.

7. The composition of matter of claim 1 wherein said polycondensate has an acid value of not more than 50 (mg. KOH/g.).

8. The composition of matter of claim 1 wherein component (i) is a mixture of 2-methylbutane-1,3-diol and different diol.

9. The composition of matter of claim 8 wherein the maximum content of the different diol in said mixture is about 70 [mol/mol] percent.

10. The composition of matter of claim 1 wherein the component (ii) is a mixture of said aromatic dicarboxylic acid and a different saturated dicarboxylic acid.

11. The composition of matter of claim 10 wherein the maximum content of the different saturated dicarboxylic acid in said mixture is about 60 [mol/mol] percent.

12. The composition of matter of claim 1 wherein said unsaturated dicarboxylic acid (iii) is at least one member selected from the group consisting of an unsaturated dicarboxylic acid or an acid anhydride thereof having four to six carbon atoms.

13. The composition of matter of claim 1 wherein the component (i) is an ester of 2-methylbutane-1,3-diol and a lower aliphatic monocarboxylic acid.

14. The composition of matter of claim 1 wherein said ethylenically unsaturated monomer is a monomer having the reactive group $CH_2=C<$.

15. The composition of matter of claim 1 which further contains about 50 to about 500 p.p.m., based on the weight of the liquid composition, of a polymerization inhibitor.

16. The composition of matter of claim 1 which further contains about 0.005 to about 5% by weight, based on the weight of the liquid composition, of a polymerization catalyst.

17. The composition of matter of claim 1 which further contains about 0.005 to about 5% by weight of a polymerization catalyst and about 0.005 to about 5% by weight of a polymerization promotor, the amounts based on the weight of the liquid composition.

18. A composition of matter which comprises a cured product prepared by polymerizing a mixture of (a) a polycondensate of (i) 2-methylbutane-1,3-diol, (ii) an aromatic dicarboxylic acid selected from the group consisting of terephthalic acid, isophthalic acid and esters thereof and (iii) an unsaturated dicarboxylic acid and (b) an ethylenically unsaturated monomer.

19. The composition of matter of claim 18 wherein said mixture is polymerized in the presence of a polymerization catalyst.

20. The composition of matter of claim 18 wherein said mixture is polymerized in the presence of a polymerization catalyst and a polymerization promotor.

21. The composition of matter of claim 18 wherein component (i) is a mixture of 2-methylbutane-1,3-diol and a different diol.

22. The composition of matter of claim 18 wherein component (ii) is a mixture of said aromatic dicarboxylic acid and a different saturated dicarboxylic acid.

23. The composition of matter of claim 18 wherein the mixture is polymerized in the presence of a filler.

24. The composition of matter of claim 18 wherein the mixture is polymerized in the presence of an inert additive.

25. The composition of matter of claim 18 wherein the mixture is polymerized in the presence of glass fibers.

References Cited

UNITED STATES PATENTS

| | | | |
|---|---|---|---|
| 3,042,650 | 7/1962 | Bockstahler | 260—861 |
| 3,196,131 | 7/1965 | Mayer et al. | 260—75 |
| 3,345,339 | 10/1967 | Parker et al. | 260—75 |
| 3,427,267 | 2/1969 | Stieger et al. | 260—22 |
| 3,252,941 | 5/1966 | Mayer et al. | 260—75 |

FOREIGN PATENTS

| | | |
|---|---|---|
| 846,912 | 9/1960 | Great Britain. |

WILLIAM H. SHORT, Primary Examiner

E. A. NIELSEN, Assistant Examiner

U.S. Cl. X.R.

260—75 UA, 861, 863, 864, 866